(12) United States Patent
Cai et al.

(10) Patent No.: US 10,352,607 B2
(45) Date of Patent: Jul. 16, 2019

(54) SELECTING CONTROL STRATEGY FOR AN EXPANSION VALVE

(71) Applicant: DANFOSS A/S, Nordborg (DK)

(72) Inventors: Junping Cai, Sønderborg (DK); Hans Jørgen Jensen, Nordborg (DK); Lars Jensen, Nordborg (DK)

(73) Assignee: Danfoss A/S, Nordborg (DK)

(*) Notice: Subject to any disclaimer, the term of this patent is extended or adjusted under 35 U.S.C. 154(b) by 0 days.

(21) Appl. No.: 15/520,935

(22) PCT Filed: Aug. 21, 2015

(86) PCT No.: PCT/EP2015/069263
§ 371 (c)(1),
(2) Date: Apr. 21, 2017

(87) PCT Pub. No.: WO2016/062430
PCT Pub. Date: Apr. 28, 2016

(65) Prior Publication Data
US 2017/0343259 A1 Nov. 30, 2017

(30) Foreign Application Priority Data
Oct. 24, 2014 (EP) .................... 14190207

(51) Int. Cl.
F25B 49/02 (2006.01)
F25B 41/04 (2006.01)
F25B 41/06 (2006.01)

(52) U.S. Cl.
CPC .......... *F25B 49/022* (2013.01); *F25B 41/043* (2013.01); *F25B 41/062* (2013.01);
(Continued)

(58) Field of Classification Search
CPC ...... F25B 49/02; F25B 49/022; F25B 49/005; F25B 41/062; F25B 41/043;
(Continued)

(56) References Cited

U.S. PATENT DOCUMENTS 2,010,500 A   8/1935  Smith
4,651,535 A * 3/1987  Alsenz .................. F25B 41/062
                                                          251/129.05
(Continued)

FOREIGN PATENT DOCUMENTS

CN   101109592 A    1/2008
CN   101307974 A *  11/2008  .......... F25B 2400/01
(Continued)

OTHER PUBLICATIONS

International Search Report for PCT Serial No. PCT/EP2015/069263 dated Oct. 12, 2015.

*Primary Examiner* — Emmanuel E Duke
(74) *Attorney, Agent, or Firm* — McCormick, Paulding & Huber LLP

(57) ABSTRACT

A method for controlling a vapor compression system, in particular an opening degree of an expansion valve. According to a first control strategy, the expansion valve is closed until the superheat value has increased above a lower threshold superheat value. According to a second control strategy, the expansion valve is kept open until the suction pressure has increased above a lower threshold suction pressure value. In the case of low superheat value as well as low suction pressure, the second control strategy is selected for a limited period of time.

20 Claims, 7 Drawing Sheets

(52) U.S. Cl.
CPC .......... *F25B 49/02* (2013.01); *F25B 2600/01* (2013.01); *F25B 2600/21* (2013.01); *F25B 2600/2513* (2013.01); *F25B 2700/1933* (2013.01); *F25B 2700/21173* (2013.01)

(58) Field of Classification Search
CPC .... F25B 2700/21173; F25B 2700/1933; F25B 2600/2513; F25B 2600/01; F25B 2600/21
See application file for complete search history.

(56) References Cited

U.S. PATENT DOCUMENTS

| | | | |
|---|---|---|---|
| 5,077,983 A | | 1/1992 | Dudley |
| 6,715,304 B1* | | 4/2004 | Wycoff ................ F25D 21/002 62/155 |
| 6,854,285 B2* | | 2/2005 | Jessen .................... F25B 49/02 236/92 B |
| 2013/0074535 A1* | | 3/2013 | Schmidt .................. F25B 40/00 62/212 |
| 2013/0160474 A1* | | 6/2013 | Qu ........................ F25B 41/062 62/222 |
| 2014/0216572 A1* | | 8/2014 | Arunasalam ......... G05D 7/0694 137/486 |
| 2014/0260381 A1* | | 9/2014 | Marte .................... F25B 49/02 62/115 |
| 2015/0219506 A1* | | 8/2015 | Izadi-Zamanabadi ...................... F25B 49/02 702/99 |

FOREIGN PATENT DOCUMENTS

| | | | |
|---|---|---|---|
| CN | 101307974 A | 11/2008 | |
| CN | 103776131 A | 5/2014 | |
| JP | 2008215806 A * | 9/2008 | ............ F25B 41/062 |
| JP | 2008215806 A * | 9/2008 | ............ F25B 41/062 |
| WO | 2006/097106 A1 | 9/2006 | |
| WO | 2007/084138 A1 | 7/2007 | |

* cited by examiner

SELECTING CONTROL STRATEGY FOR AN EXPANSION VALVE

CROSS-REFERENCE TO RELATED APPLICATIONS

This application is a National Stage application of International Patent Application No. PCT/EP2015/069263, filed on Aug. 21, 2015, which claims priority to European Patent Application No. 14190207.2, filed on Oct. 24, 2014, each of which is hereby incorporated by reference in its entirety.

TECHNICAL FIELD

The present invention relates to a method for controlling a vapour compression system, such as a refrigeration system, an air condition system or a heat pump. The method of the invention relates to control operation of an expansion valve of the vapour compression system in order to ensure a sufficient suction pressure level, while preventing damage to the compressor due to liquid refrigerant passing through the evaporator and reaching the compressor.

BACKGROUND

Vapour compression systems, such as refrigeration systems, air condition systems or heat pumps, normally comprise a compressor, a condenser, an expansion device, e.g. in the form of an expansion valve, and an evaporator, arranged in a refrigerant path. Refrigerant flowing in the refrigerant path is alternatingly compressed by means of the compressor and expanded by means of the expansion device, and heat exchange takes place in the condenser and the evaporator. In the condenser heat is rejected from the refrigerant flowing through the condenser, and in the evaporator heat is absorbed by the refrigerant flowing through the evaporator. Thus, cooling or heating can be provided to a closed volume arranged in thermal contact with the evaporator or the condenser, respectively.

As described above, refrigerant is expanded by the expansion device before being supplied to the evaporator. Therefore the refrigerant being supplied to the evaporator is in a mixed gaseous and liquid state. In the evaporator, the liquid part of the refrigerant is at least partly evaporated, and the refrigerant absorbs heat due to this phase transition. If all of the liquid refrigerant is evaporated before it reaches the end of the evaporator, the gaseous refrigerant is heated, and the refrigerant leaving the evaporator has a temperature which is higher than the dew point of the refrigerant. The temperature difference between the temperature of the refrigerant leaving the evaporator and the dew point is referred to as the superheat of the refrigerant.

It is desirable to ensure that liquid refrigerant is present in the evaporator along the entire length, i.e. that the superheat of the refrigerant leaving the evaporator is zero or close to zero, because thereby it is ensured that the energy consumed is spent on evaporating refrigerant, thereby providing cooling, rather than on heating the gaseous refrigerant. Thus, a low superheat value ensures that the refrigerating capacity of the vapour compression system is utilised to the greatest possible extent.

On the other hand, liquid refrigerant should not be allowed to leave the evaporator, to such an extent that liquid refrigerant reaches the compressor, because this may lead to damage of the compressor. Therefore vapour compression systems are normally operated in order to obtain a small, but positive, superheat of the refrigerant leaving the evaporator. This is normally done by operating the expansion valve, thereby controlling the supply of refrigerant to the evaporator.

In some situations, such as during start-up of a vapour compression system, the evaporation temperature may be very low. In this case, when controlling the expansion device in order to obtain a positive superheat value, the suction pressure may become very low, because the supply of refrigerant to the evaporator is reduced in order to prevent liquid refrigerant from passing through the evaporator. A low suction pressure is also undesirable, and in order to increase the suction pressure, it is necessary to increase the supply of refrigerant to the evaporator. Thus, there are two conflicting control strategies: One requesting that the supply of refrigerant to the evaporator is decreased in order to prevent liquid refrigerant from passing through the evaporator, and one requesting that the supply of refrigerant to the evaporator is increased in order to increase the suction pressure. In such situations, the control strategy requesting that the supply of refrigerant to the evaporator is decreased will normally be selected, because it is considered more important to prevent potential damage to the compressor than to increase the suction pressure. However, this may result in an inefficient start-up of the vapour compression system.

U.S. Pat. No. 5,077,983 discloses a method and apparatus for improving efficiency of a pulsed expansion valve heat pump. During normal operation the expansion valve is pulsed to control the flow of refrigerant to the evaporator component. The expansion valve is pulsed under the control of a proportional integral algorithm so as to control the compressor discharge temperature to maintain it at a target temperature which maximizes the steady state system efficiency. During start-up of the compressor the discharge temperature control of the expansion valve is interrupted, and a constant duty cycling pulsing of the expansion valve is substituted until the discharge temperature reaches a predetermined value.

SUMMARY

It is an object of embodiments of the invention to provide a method for controlling a vapour compression system, wherein the efficiency of the vapour compression system is improved, while the risk of damage to the compressor is minimised.

It is a further object of embodiments of the invention to provide a method for controlling a vapour compression system, in which an acceptable suction pressure level is maintained, while the risk of damage to the compressor due to liquid refrigerant reaching the compressor is minimised.

The invention provides a method for controlling a vapour compression system, the vapour compression system comprising a compressor, a condenser, an expansion valve and an evaporator arranged in a refrigerant path, the refrigerant path defining a suction line interconnecting an outlet of the evaporator and an inlet of the compressor, the method comprising the steps of:

obtaining a superheat value of refrigerant leaving the evaporator and entering the suction line,
   obtaining a suction pressure of refrigerant flowing in the suction line,
   in the case that the obtained superheat value is below a lower threshold superheat value, requesting that the expansion valve is operated according to a first control strategy, in which the expansion valve is closed until the superheat value has increased above the lower threshold superheat value, in the case that the obtained suction pressure is below a lower threshold suction pressure value, requesting that the expansion valve is operated according to a second control strategy, in which the expansion valve is kept open until the suction pressure has increased above the lower threshold suction pressure value, in the case that only the first control strategy or only the second control strategy is requested, selecting the requested control strategy, and in the case that the first control strategy as well as the second control strategy is requested, selecting the second control strategy for a period of time which does not exceed a predefined maximum period of time.

The invention relates to a method for controlling a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor, a condenser, an expansion valve and an evaporator arranged in a refrigerant path. Thus, refrigerant flowing in the refrigerant path is compressed by means of the compressor before being supplied to the condenser. In the condenser, the refrigerant is at least partly condensed, while heat exchange takes place with the ambient in such a manner that heat is rejected from the refrigerant flowing through the condenser. The refrigerant is then passed to the expansion valve, where it is expanded before entering the evaporator. Thus, the expansion valve controls the supply of refrigerant to the evaporator. The refrigerant entering the evaporator is in a mixed liquid and gaseous state. In the evaporator, the liquid part of the refrigerant is at least partly evaporated, while heat exchange takes place with the ambient in such a manner that heat is absorbed by the refrigerant flowing through the evaporator. Finally, the refrigerant is once again supplied to the compressor.

The refrigerant path defines a suction line interconnecting an outlet of the evaporator and an inlet of the compressor. Thus, refrigerant leaving the evaporator enters the suction line, and flows via the suction line to the compressor.

According to the method, a superheat value of refrigerant leaving the evaporator and entering the suction line is obtained. As described above, the superheat value is the difference between the temperature of the refrigerant leaving the evaporator and the dew point of the refrigerant. Thus, the superheat value depends on the temperature as well as the pressure of the refrigerant leaving the evaporator. The superheat value may be obtained by measuring the superheat value directly. As an alternative, the superheat value may be derived from one or more other measured parameters, for instance the temperature and the pressure of the refrigerant leaving the evaporator, or the temperature of the refrigerant leaving the evaporator and the temperature of the refrigerant entering the evaporator, or the evaporation temperature.

Furthermore, a suction pressure of refrigerant flowing in the suction line is obtained. The suction pressure is a pressure prevailing in the suction line. The suction pressure may be measured directly, e.g. by means of a pressure sensor arranged in the suction line. As an alternative, the suction pressure may be derived from one or more other measured parameters.

Next the obtained superheat value and the obtained suction pressure are compared to respective lower threshold values.

In the case that the obtained superheat value is below a lower threshold superheat value, it is requested that the expansion valve is operated according to a first control strategy. According to the first control strategy, the expansion valve is closed until the superheat value has increased above the lower threshold superheat value.

As described above, when the superheat value is very low, this is an indication that liquid refrigerant is present along almost the entire length of the evaporator, and therefore there is a risk that liquid refrigerant enters the suction line, possibly even reaching the compressor, if the superheat value is allowed to decrease further. Therefore the supply of refrigerant to the evaporator must be decreased in this case, and this can be obtained by keeping the expansion valve closed until the superheat value has increased to a level above the lower threshold superheat value. The lower threshold superheat value may advantageously represent a superheat value, below which there is a significant risk of liquid refrigerant entering the suction line.

In the case that the obtained suction pressure is below a lower threshold suction pressure value, it is requested that the expansion valve is operated according to a second control strategy. According to the second control strategy, the expansion valve is kept open until the suction pressure has increased above the lower threshold suction pressure value.

As described above, a very low suction pressure is undesirable. The suction pressure can be increased by increasing the supply of refrigerant to the evaporator, or by at least not reducing the supply of refrigerant to the evaporator, thereby increasing the amount of refrigerant passing through the evaporator and increasing the suction pressure. This can be obtained by keeping the expansion valve open until the suction pressure has increased to a level above the lower threshold suction pressure value. The lower threshold suction pressure value may advantageously represent a suction pressure value, below which there is a risk that the vapour compression system will operate inefficiently.

Depending on the values of the superheat and the suction pressure, respectively, none of the first and the second control strategies may be requested, only the first control strategy may be requested, only the second control strategy may be requested, or the first control strategy as well as the second control strategy may be requested.

In the case that none of the first and the second control strategies is requested, the expansion valve may be controlled in accordance with a standard or normal control strategy, e.g. controlling the opening degree of the expansion valve in order to obtain a reference superheat value.

In the case that only the first control strategy is requested, the first control strategy is selected, i.e. the expansion valve is controlled in accordance with the first control strategy. Thus, in this case the expansion valve is closed until the superheat value has increased above the lower threshold superheat value.

Similarly, in the case that only the second control strategy is requested, the second control strategy is selected, i.e. the expansion valve is controlled in accordance with the second control strategy. Thus, in this case the expansion valve is kept open until the suction pressure has increased above the lower threshold suction pressure value.

However, in the case that the first control strategy as well as the second control strategy is selected, a conflict exists, since the first control strategy will attempt to close the expansion valve, and the second control strategy will attempt to keep the expansion valve open. Accordingly, a choice must be made regarding which of the two requested control strategies to select. Under normal circumstances, the first control strategy would be granted priority over the second control strategy, because the consequences of a very low superheat value are considered more severe than the consequences of a very low suction pressure. However, this may, in some cases, lead to a situation where the vapour compression system is not operating properly.

According to the method of the invention, in the case that the first control strategy as well as the second control strategy is requested, the second control strategy is selected for a period of time which does not exceed a predefined maximum period of time. Accordingly, the second control strategy is granted priority over the first control strategy, but only for a limited period of time, defined by the predefined maximum period of time. Thus, in the case of a conflict, as described above, the expansion valve is kept open in order to increase the suction pressure, until the suction pressure has increased above the lower threshold suction pressure value, or until the predefined maximum period of time has elapsed, or until there is no longer a conflict, i.e. until only one of the first control strategy and the second control strategy is requested, or none of the control strategies is requested.

Granting the second control strategy priority over the first control strategy ensures that the suction pressure is increased, and that the vapour compression system therefore operates properly. In particular, in the case that the conflict occurs following a start-up of the compressor, it is ensured that the vapour compression system is brought into normal operating conditions fast. On the other hand, since the second control strategy is only granted priority over the first control strategy for a limited period of time, the risk of causing damage to the compressor, due to liquid refrigerant passing through the evaporator, is minimised.

The predefined maximum period of time may advantageously have a length which represents a period of time in which it is considered acceptable to operate the vapour compression system at a superheat value which is below the lower threshold superheat value, for instance a period of time which ensures a minimal risk of liquid refrigerant passing through the evaporator to an extent which may cause damage to the compressor. The predefined maximum period of time may, e.g., be within the interval 30 seconds to 10 minutes, such as within the interval 1 minute to 7 minutes, such as within the interval 2 minutes to 5 minutes, such as in the order of a few minutes. The predefined maximum period of time may be selected for a given vapour compression system in such a manner that local operating conditions and design features of the vapour compression system are taken into account.

Thus, by controlling a vapour compression system by means of the method according to the invention it is ensured that an acceptable suction pressure is obtained, thereby ensuring proper operation of the vapour compression system, while the risk of damage to the compressor, due to liquid refrigerant reaching the compressor, is minimised.

The method may further comprise the step of, in the case that the first control strategy as well as the second control strategy is requested, switching to the first control strategy when the predefined maximum period of time has elapsed, or when the suction pressure has increased above the lower threshold suction pressure value, the second control strategy thereby no longer being requested.

If a conflict exists, and the second control strategy is therefore selected as described above, it must be ensured that the second control strategy is only granted priority over the first control strategy for a limited period of time. Therefore, according to this embodiment, the first control strategy is granted priority over the second control strategy if the predetermined period of time elapses, without the suction pressure having been increased above the lower threshold suction pressure value. Accordingly, a switch from the second control strategy to the first control strategy is performed, i.e. the expansion valve is closed.

Furthermore, a switch from the second control strategy to the first control strategy is also performed in the case that the suction pressure increases above the lower threshold suction pressure value before the predetermined period of time has elapsed. In this case, the second control strategy is no longer requested, and thereby a conflict no longer exists. Accordingly, only the first control strategy is then requested, and therefore a switch from the second control strategy to the first control strategy is appropriate.

The method may further comprise the step of reducing the maximum period of time, if the first control strategy as well as the second control strategy has been requested during a previous period of time, and the second control strategy has been selected during said period of time.

According to this embodiment, the maximum period of time is not a fixed period being applied each time a conflict occurs, i.e. each time it occurs that the first control strategy as well as the second control strategy is requested. Instead the recent history of the vapour compression system is taken into account when determining for how long the second control strategy can be granted priority over the first control strategy. Thus, if the second control strategy has been granted priority over the first control strategy during another period of conflict which occurred recently, it is undesirable to grant the second control strategy priority over the first control strategy for a full maximum period of time, because this will increase the risk of damage being caused to the compressor significantly. Therefore the maximum period of time is reduced in this case.

The maximum period of time may be reduced by an amount which depends on a length of a time interval since said period of time ended and/or the length of said period of time. According to this embodiment, the 'right' to a full maximum period of time may be regained if a sufficient time interval since the second control strategy was last granted priority over the first control strategy has been allowed to lapse before a new conflict occurs. Accordingly, the reduction of the maximum period of time may be smaller in the case that the previous period occurred a long time ago, than if the previous period occurred very recently.

Furthermore, if the previous period during which the second control strategy was granted priority was very short, it may not be considered a problem to allow the second control strategy to be granted priority over the first control strategy for the full maximum period of time, or almost the full maximum period of time, even if the previous period occurred very recently. In this case the reduction of the maximum period of time may be relatively small. On the other hand, if the previous period was long, such as close to the full maximum period of time, it may be desirable to reduce the maximum period of time by a large amount.

The method may further comprise the step of allowing a counter to count up whenever the first control strategy as well as the second control strategy is requested, and the second control strategy is selected, the counter being allowed to count up until the counter reaches a value corresponding to the predefined maximum period of time.

According to this embodiment, the counter counts up whenever a conflict occurs, and as long as the second control strategy is granted priority over the first control strategy. Thereby it can easily be ensured that the second control strategy is not granted priority over the first control strategy for a period of time which exceeds the maximum period of time. If the conflict ends for some reason, e.g. because one of the control strategies is no longer requested or because the maximum period of time has elapsed, then the counter is at least stopped. Thereby it can be ensured that even if a period of conflict is interrupted by a period of no conflict, the second control strategy is still not granted priority over the first control strategy for a combined period of time which exceeds the maximum period of time.

According to one embodiment, when the accumulated counter setting reaches the value corresponding to the maximum period of time, the second control strategy may not be granted priority over the first control strategy again before the vapour compression system has been reset. Thereby it can be prevented that small periods of time where the second control strategy is granted priority over the first control strategy, are allowed during a long stretch of time, when the vapour compression system operates near the lower threshold suction pressure value. This protects the compressor.

It should be noted that in the case that the maximum period of time has been reduced, as described above, the counter is allowed to count up to a value corresponding to the reduced maximum period of time. Or the counter may be started at a level corresponding to the reduction.

The method may further comprise the step of allowing the counter to count down whenever the obtained suction pressure is above the lower threshold suction pressure value, and the second control strategy is therefore not requested, and/or whenever the obtained superheat value is above the lower threshold superheat value, and the first control strategy is therefore not requested.

According to this embodiment, the counter is allowed to count down during periods of time where no conflict occurs. Thereby the 'right' to another period where the second control strategy is granted priority over the first control strategy can be regained. If the counter has counted down, but not reached 'zero' when a new conflict occurs, then the maximum period of time is simply reduced by an amount corresponding to the counter status. Thereby the reduction of the maximum period of time depends on the duration of a previous period of conflict, as well as on the time elapsed since the previous period of conflict ended, since the counter was allowed to count up during the previous period of conflict, and the counter was allowed to count down during the period since the previous period of conflict ended.

The counting rate of the counter may be identical during count up and count down. In this case the 'right' to a full maximum period of time has been regained as soon as the time elapsed since the previous period of conflict ended is equal to the length of the previous period of conflict.

As an alternative, the count up rate of the counter may be different from the count down rate of the counter. For instance, the count up rate may be faster than the count down rate. In this case, in order to regain the 'right' to a full maximum period of time, the time interval elapsing since the previous period of conflict ended must be longer than the length of the previous period of conflict. This provides better protection for the compressor.

The method may further comprise the step of gradually increasing the lower threshold superheat value in the case that the obtained superheat value is below the lower threshold superheat value, and the first control strategy is selected, until the increased lower threshold superheat value reaches a higher threshold superheat value, or until the superheat value increases above the increased lower threshold superheat value.

When the superheat value of the refrigerant leaving the evaporator decreases only slightly below the lower threshold superheat value, the error between the actual superheat value and the lower threshold superheat value is very small. Therefore the opening degree of the expansion valve is only adjusted slightly or slowly. This may have the consequence that it takes a relatively long time before the superheat value increases above the lower threshold superheat value, and an acceptable superheat value is thereby reached.

According to this embodiment, and in order to avoid the disadvantages described above, the lower threshold superheat value is increased when the obtained superheat value decreases below the lower threshold superheat value. Thereby the error between the actual superheat value and the lower threshold superheat value is increased. As a consequence, the opening degree of the expansion valve is adjusted in a more aggressive manner, and the superheat value is therefore increased faster.

The lower threshold superheat value is increased until it reaches a higher threshold superheat value, or until the superheat value increases above the increased lower superheat value. The higher threshold superheat value may preferably correspond to a limit, beyond which it is not desirable to increase the lower threshold superheat value. For instance, it may be undesirable to increase the lower threshold superheat value to a level which is too close to the superheat set point value.

In the case that the obtained superheat value increases above the increased lower superheat threshold value before the lower threshold superheat value has been increased to the higher threshold superheat value, then the problem of the low superheat value has been solved, and there is no longer a reason for increasing the lower threshold superheat value in order to establish a larger error. Therefore the increase of the lower threshold superheat value is also stopped in this case.

The method may further comprise the step of decreasing the increased lower threshold value when the obtained superheat value increases above the higher threshold superheat value, until the decreased lower threshold superheat value reaches the original lower threshold superheat value.

According to this embodiment, the lower threshold superheat value is gradually decreased to the original level when the superheat value has increased to an acceptable level, i.e. above the higher threshold superheat value.

The method may further comprise the steps of:
monitoring selection of control strategy and determining a number of times a switch between the first control strategy and the second control strategy is performed during a predefined time interval, and
preventing that the second control strategy is selected in the case that the number of times a switch between the first control strategy and the second control strategy is performed during the predefined time interval exceeds a predefined threshold value.

In the case that the control of the expansion valve is continuously switched between the first control strategy and the second control strategy, within a limited time interval, this is an indication that a low superheat value as well as a low suction pressure continues to prevail in the vapour compression system, and that these problems are not solved, because each switch in control strategy counteracts the results obtained with respect to one of these problems when the previous control strategy was applied. Under these circumstances, the low superheat value is considered the most critical, because this may lead to liquid refrigerant passing through the evaporator, and thereby potentially risking damage to the compressor.

Thus, in this case it is decided that the superheat value must be increased, even if this leads to a very low suction pressure. Accordingly, it is prevented that the second control strategy can be selected, at least for a period of time, e.g. until an acceptable superheat value has been reached.

The step of preventing that the second control strategy is selected may further be performed on the basis of the obtained suction pressure. For instance, this step may only be performed if the suction pressure is also below a certain, low level, e.g. the lower threshold suction pressure value.

Once the suction pressure has increased to an acceptable level, the second control strategy may be reactivated in the sense that it is again possible to select the second control strategy in the manner described above.

BRIEF DESCRIPTION OF THE DRAWINGS

The invention will now be described in further detail with reference to the accompanying drawings, in which.

DETAILED DESCRIPTION

Figure 1:
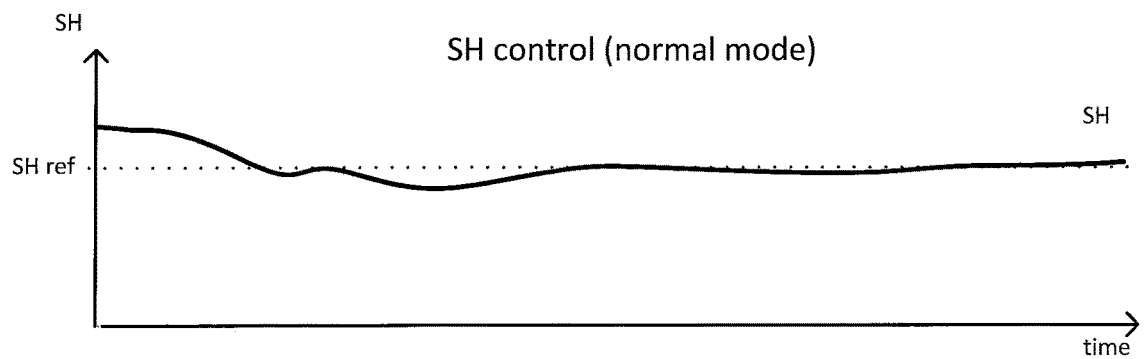
FIG. 1 is a graph illustrating variations of a superheat value as a function of time during normal operation of a vapour compression system.

FIG. 1 is a graph illustrating variations of a superheat value as a function of time during normal operation of a vapour compression system. The vapour compression system is controlled by adjusting the supply of refrigerant to the evaporator by adjusting an opening degree of an expansion valve arranged upstream relative to the evaporator. The supply of refrigerant to the evaporator is controlled in order to obtain a superheat value of refrigerant leaving the evaporator, which is equal to a superheat reference value, SH ref. It can be seen from the graph of FIG. 1 that the superheat value approaches the superheat reference value.

Figure 2:
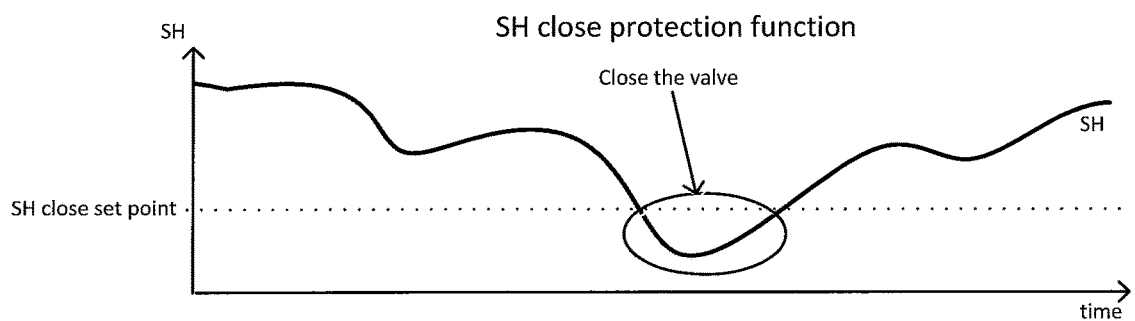
FIG. 2 is a graph illustrating variations of a superheat value as a function of time during a period of low superheat.

FIG. 2 is a graph illustrating variations of a superheat value as a function of time during a period of low superheat. It can be seen from the graph of FIG. 2 that the superheat value initially decreases significantly towards a lower superheat threshold value, SH close set point.

When the superheat value of refrigerant leaving the evaporator is very low this is an indication that liquid refrigerant is present along almost the entire length of the evaporator. Therefore there is a risk that liquid refrigerant passes through the evaporator, potentially reaching the compressor, if the superheat value decreases further. Therefore, when the superheat value is low, it is necessary to take measures in order to increase the superheat value, thereby protecting the compressor.

When the superheat value decreases below the lower threshold superheat value, SH close set point, the expansion valve is operated according to a first control strategy. According to the first control strategy, the expansion valve is closed until the superheat value has increased above the lower threshold superheat value, SH close set point. When the expansion valve is closed, the supply of refrigerant to the evaporator is stopped. Thereby the amount of liquid refrigerant in the evaporator is decreased, and thereby the superheat of refrigerant leaving the evaporator is increased.

It can be seen from the graph of FIG. 2 that the superheat value increases following a period of closing the expansion valve.

Figure 3:
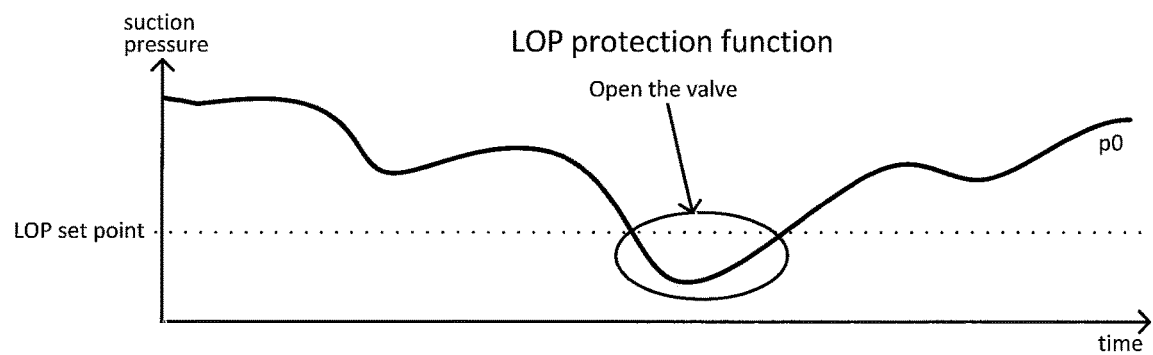
FIG. 3 is a graph illustrating variations of a suction pressure as a function of time during a period of low suction pressure.

FIG. 3 is a graph illustrating variations of a suction pressure as a function of time during a period of low suction pressure. It can be seen from the graph of FIG. 3 that the suction pressure initially decreases significantly towards a lower suction pressure threshold value, LOP set point.

When the suction pressure is low, there is a risk that the vapour compression system is not operating properly. Therefore, when a low suction pressure is detected, it is desirable to take measures in order to increase the suction pressure, thereby ensuring that the vapour compression system operates properly.

When the suction pressure decreases below the lower threshold suction pressure value, LOP set point, the expansion valve is operated according to a second control strategy. According to the second control strategy, the expansion valve is kept open until the suction pressure has increased above the lower threshold suction pressure value, LOP set point. When the expansion valve is kept open, a continuous supply of refrigerant to the evaporator is ensured. Thereby the amount of refrigerant leaving the evaporator and entering the suction line is at least not decreased, and this will increase the suction pressure.

It can be seen from the graph of FIG. 3 that the suction pressure increases following a period of keeping the expansion valve open.

The control method illustrated in FIG. 2 and the control method illustrated in FIG. 3 are both applied in order to protect the vapour compression system in abnormal situations, i.e. in the case of a low superheat value (FIG. 2) or in the case of a low suction pressure (FIG. 3). As long as only one of these situations occurs, i.e. a low superheat value, but an acceptable suction pressure, or a low suction pressure, but an acceptable superheat value, the first or second control strategy is simply applied in order to provide relevant protection for the vapour compression system.

However, in the case that both of the situations described above occur simultaneously, it is not possible to apply the first control strategy as well as the second control strategy, because the first control strategy requires that the expansion valve is closed, while the second control strategy requires that the expansion valve is kept open. Accordingly, a conflict exists, and it must be determined which of the control strategies to select. This will be described in further detail below with reference to FIG. 4.

Figure 4:
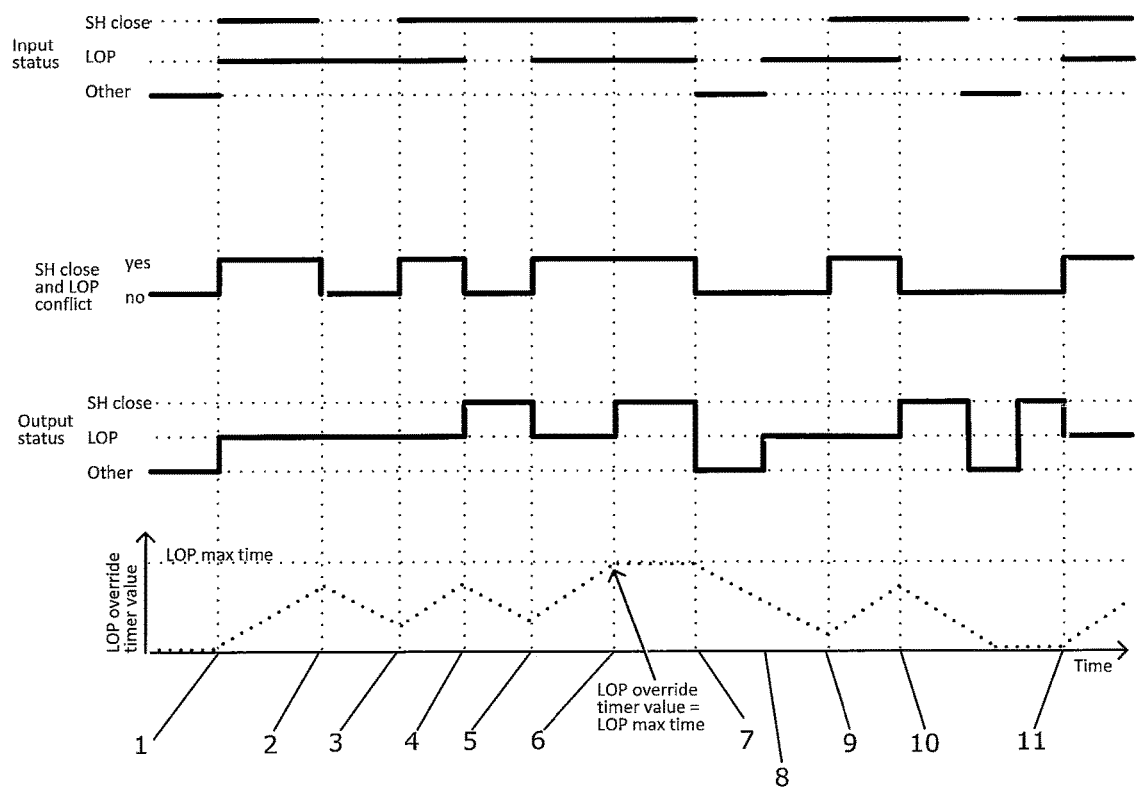
FIG. 4 is a graph illustrating a method for controlling a vapour compression system according to an embodiment of the invention.

FIG. 4 is a graph illustrating a method for controlling a vapour compression system according to an embodiment of the invention. The graph shows an input status, a conflict indicator, an output status and a counter status as a function of time.

The input status indicates, for any given time, whether a first control strategy (SH close) is requested, a second control strategy (LOP) is requested, and/or another control strategy (Other) is requested. The first control strategy (SH close) has been described above with reference to FIG. 2, and the second control strategy (LOP) has been described above with reference to FIG. 3. When neither the first control strategy (SH close), nor the second control strategy (LOP) is requested, another control strategy (Other) is applied, e.g. as described above with reference to FIG. 1.

In the case that the first control strategy (SH close) as well as the second control strategy (LOP) is requested, a conflict exists, because the first control strategy (SH close) requires that the expansion valve is closed, while the second control strategy (LOP) requires that the expansion valve is kept open. On the other hand, if only either the first control strategy (SH close) or the second control strategy (LOP) is requested, there is no conflict, and the requested control strategy can simply be selected.

The conflict indicator indicates whether or not a conflict exists. Thus, if the conflict indicator indicates a 'yes', then a conflict exists, i.e. the first control strategy (SH close) as well as the second control strategy (LOP) is requested simultaneously. Similarly, if the conflict indicator indicates a 'no', then there is no conflict, i.e. either only one of the first control strategy (SH close) or the second control strategy (LOP) is requested, or another control strategy (Other) is requested.

The output status indicates which control strategy is selected, i.e. whether the first control strategy (SH close), the second control strategy (LOP) or another control strategy (Other) is selected at any given time. If the conflict indicator indicates a 'no', then the requested control strategy is simply selected.

On the other hand, if the conflict indicator indicates a 'yes', then the second control strategy (LOP) is selected. When this happens, a counter starts counting up, in order to ensure that the second control strategy (LOP) is only allowed to be selected for a limited period of time. When a conflict no longer exists, i.e. when the conflict indicator indicates a 'no', the counter starts counting down.

At time 1 the conflict indicator is switched to 'yes', because the first control strategy (SH close) as well as the second control strategy (LOP) is requested simultaneously. As a consequence the output status is switched from 'Other' to 'LOP', i.e. the second control strategy (LOP) is selected, and the counter starts counting up.

At time 2 the conflict indicator is switched to 'no' because the first control strategy (SH close) is no longer requested. Thereby only the second control strategy (LOP) is requested, and a conflict no longer exists. Accordingly, the second control strategy (LOP) is still selected, since it is the only control strategy requested. However, the counter starts counting down, because a conflict no longer exists.

At time 3 the conflict indicator is once again switched to 'yes', because the first control strategy (SH close) is requested, and the second control strategy (LOP) is still requested. Therefore a conflict exists once again. Therefore the second control strategy (LOP) is selected, and the counter starts counting up again. From time 2 to time 3, the counter value has been reduced, because the counter has been counting down. However, it has not reached a zero value, because the time which has elapsed since the previous conflict period ended at time 2 is not sufficiently long to counteract that the second control strategy (LOP) was selected during the previous conflict period. Therefore the maximum period of time which the second control strategy (LOP) is allowed to be selected is reduced by an amount corresponding to the counter value at the time 3.

At time 4 the conflict indicator is switched to 'no', because the second control strategy (LOP) is no longer requested. Thus, only the first control strategy (SH close) is requested, and a conflict no longer exists. As a consequence, the output status is switched from 'LOP' to 'SH close', i.e. the first control strategy (SH close) is selected. Furthermore, the counter starts counting down, because a conflict no longer exists.

At time 5 the conflict indicator is switched to 'yes', because the second control strategy (LOP) is once again requested, and the first control strategy (SH close) is still requested. Therefore a conflict exists once again. Accordingly, the output status is switched from 'SH close' to 'LOP', i.e. the second control strategy (LOP) is selected. Furthermore, the counter starts counting up again.

At time 6 the counter reaches a predefined maximum value (LOP max time), indicating that it is no longer safe to select the second control strategy (LOP). Therefore the output status is switched from 'LOP' to 'SH close', i.e. the first control strategy is selected. Since the conflict indicator is still indicating a 'yes', the counter is not counting down, but remains at the predefined maximum value (LOP max time).

At time 7 the conflict indicator is switched to 'no', because neither the first control strategy (SH close), nor the second control strategy (LOP) is requested. As a consequence, the output status is switched to 'Other', and the counter starts counting down.

At time 8 the second control strategy (LOP) is requested, and the output status is switched to 'LOP'. The counter continues to count down, because no conflict exists.

At time 9 the first control strategy (SH close) is requested, the conflict indicator is switched to 'yes', the output status remains at CLOP', and the counter starts counting up. It is once again safe to select the second control strategy (LOP) during a period of conflict, because the counter has been allowed to count down, i.e. sufficient time has elapsed since the previous period of conflict.

At time 10 the conflict indicator is switched to 'no', because the second control strategy (LOP) is no longer requested. A period of time follows, in which the first control strategy (SH close) is requested some of the time, and another control strategy (Other) is requested some of the time, but no conflict exists. Therefore the counter counts down until it reaches zero, and the count down stops. Then sufficient time has elapsed since the previous period of conflict to ensure that it is safe to select the second control strategy during a period of conflict, for the full maximum period of time.

At time 11 the second control strategy (LOP) is once again requested, the conflict indicator is switched to 'yes', the output status is switched to 'LOP', and the counter starts counting up again.

Figure 5:
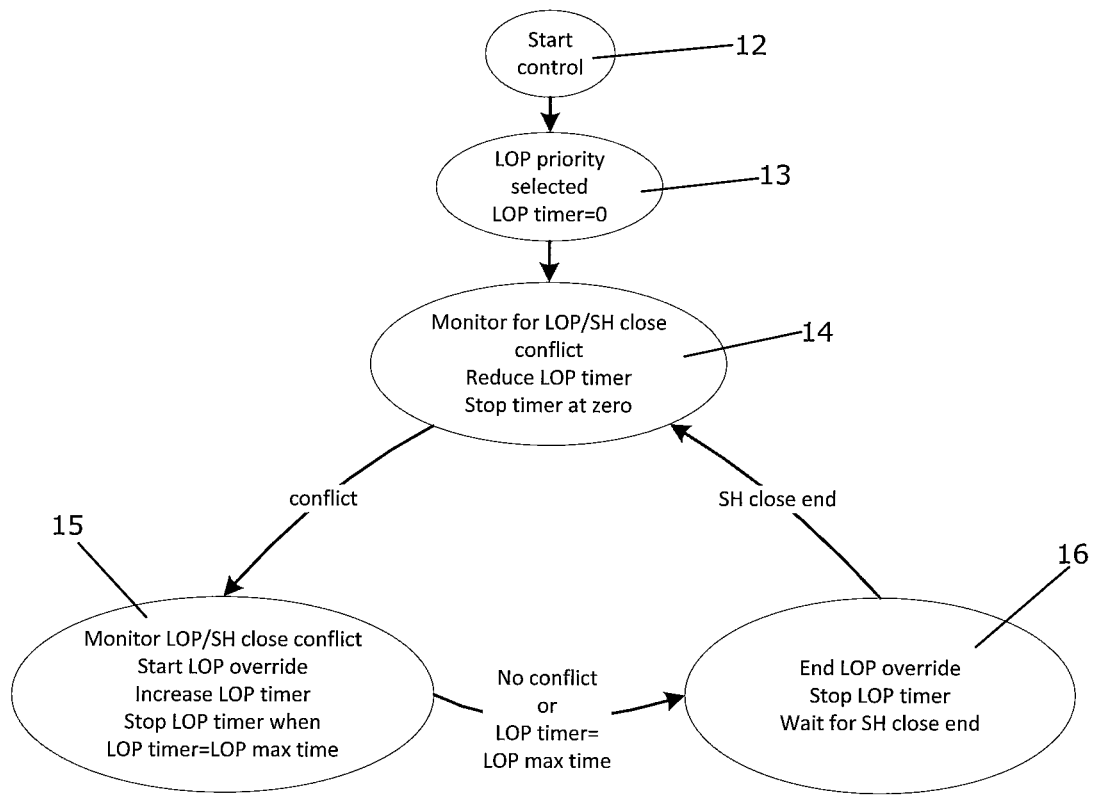
FIG. 5 is a state diagram illustrating a method for controlling a vapour compression system according to an embodiment of the invention.

FIG. 5 is a state diagram illustrating a method for controlling a vapour compression system according to an embodiment of the invention. At step 12 control of the vapour compression system is started, e.g. by starting the compressor of the vapour compression system.

At step 13 a 'LOP priority mode' is selected, allowing a second control strategy (LOP) to be selected in the case of a conflict, i.e. in the case that a first control strategy (SH close) and a second control strategy (LOP) are selected simultaneously. A counter is set to zero.

At step 14 it is monitored whether or not a conflict exists, i.e. whether or not the first control strategy (SH close) and the second control strategy (LOP) are requested simultaneously.

In the case that a conflict is detected, the process is forwarded to step 15, where the second control strategy (LOP) is selected, i.e. the second control strategy (LOP) is given priority with respect to the first control strategy (SH close). Furthermore the counter starts counting up. While the second control strategy (LOP) is given priority with respect to the first control strategy (SH close) it is monitored whether a conflict continues to exist, i.e. whether the first control strategy (SH close) as well as the second control strategy (LOP) continues to be requested simultaneously. Furthermore, the counter value is monitored.

In the case that there is no longer a conflict, or in the case that the counter reaches a predefined maximum counter value, the process is forwarded to step 16, where the second control strategy (LOP) is no longer given priority with respect to the first control strategy (SH close). Thus, if a conflict still exists when the process is forwarded to step 16, the first control strategy (SH close) is selected instead of the second control strategy (LOP), i.e. a switch in control strategy is performed. Furthermore, the counter is stopped. Finally, the process is returned to step 14 when the superheat value has increased above the lower threshold superheat value, and the first control strategy (SH close) is therefore no longer requested. At step 14 the counter starts counting down until a zero counter value is reached, or until the process is once again forwarded to step 15, due to a new conflict.

Figure 6:
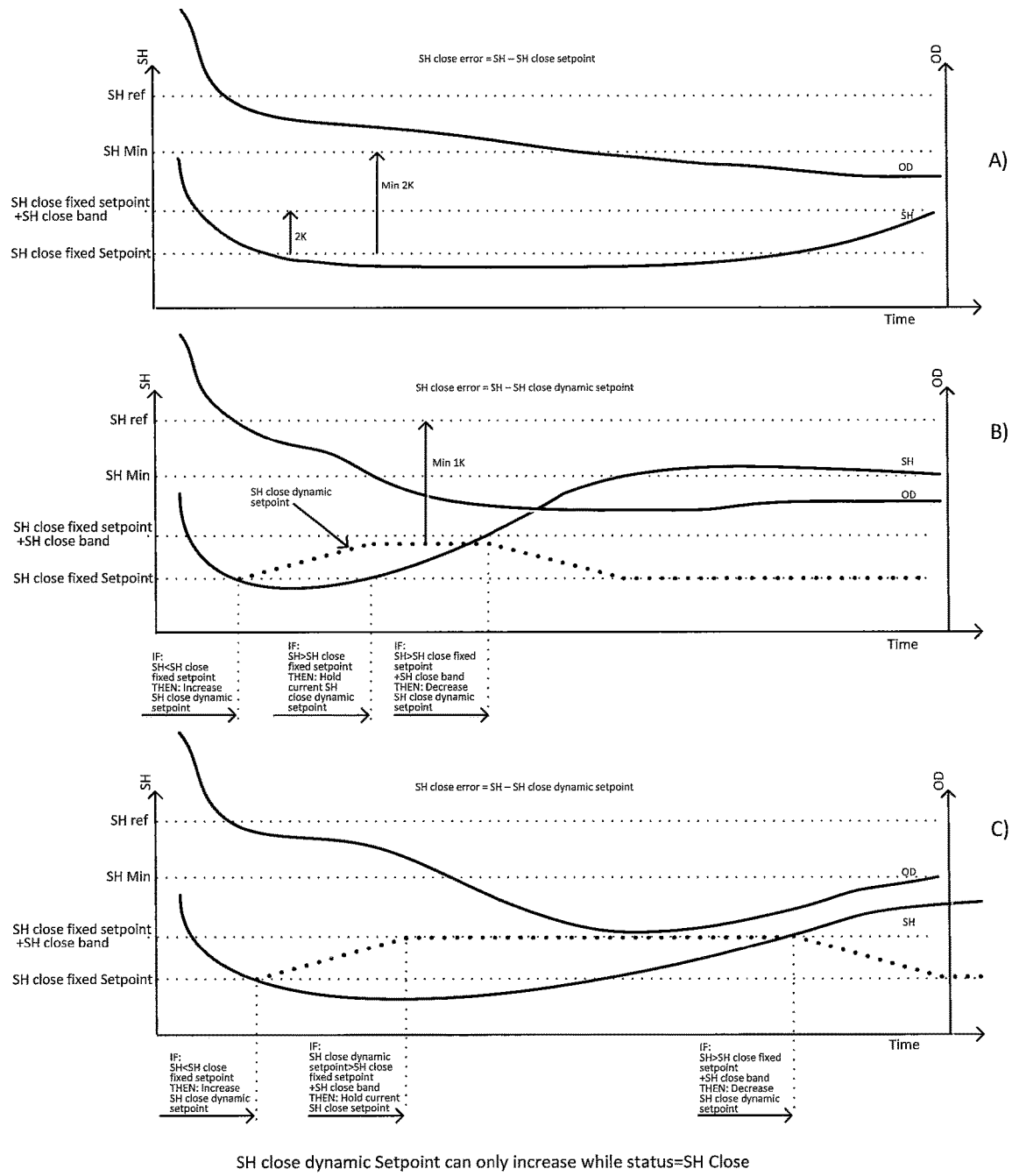
FIG. 6 illustrates a method according to an embodiment of the invention, in which a lower threshold superheat value is adjusted.

FIG. 6 illustrates a method according to an embodiment of the invention, in which a lower threshold superheat value is adjusted. Three graphs illustrating corresponding values of obtained superheat value (SH) and opening degree (OD) of the expansion valve are shown in FIGS. 6A, 6B and 6C, during operation of the expansion valve according to a first control strategy.

FIG. 6A illustrates an embodiment in which a fixed lower threshold superheat value is applied. When the superheat value (SH) decreases below a lower threshold superheat value (SH close fixed Setpoint) the opening degree (OD) of the expansion valve is decreased. However, since the superheat value (SH) is only slightly below the lower threshold superheat value (SH close fixed Setpoint), the opening degree (OD) is only decreased slightly and slowly. As a consequence, the impact on the superheat value (SH) is only very small, and therefore the superheat value (SH) increases slowly. Therefore it may take a long time before the superheat value (SH) has increased above the lower threshold superheat value (SH close fixed Setpoint).

The lower threshold superheat value (SH close fixed setpoint) is selected in such a manner that it is at least 2K lower than a superheat minimum value (SM Min), below which the superheat values should not be allowed to decrease during normal operation of the vapour compression system, where the vapour compression system is operated in accordance with a superheat reference value (SH ref).

FIG. 6B illustrates a method according to one embodiment of the invention, where the opening degree of the expansion valve is controlled in accordance with a first control strategy. When the superheat value (SH) decreases below the lower threshold superheat value (SH close fixed Setpoint) a gradual increase in the lower threshold superheat value (SH close dynamic setpoint) is initiated. Thereby the difference between the superheat value (SH) and the lower threshold superheat value (SH close dynamic setpoint) is increased. Since this difference is used as a control parameter for controlling the opening degree of the expansion valve, the opening degree of the expansion valve is decreased faster and to a greater extent than is the case in the embodiment illustrated in FIG. 6A. This can be seen in FIG. 6B. It can also be seen that this results in superheat value (SH) increasing faster than in the embodiment illustrated in FIG. 6A.

The lower threshold superheat value (SH close dynamic setpoint) is increased until the superheat value (SH) has increased above the original lower superheat threshold value (SH close fixed Setpoint). Then the increased lower threshold superheat value (SH close dynamic setpoint) is maintained at the current level until the superheat value (SH) has increased above a higher threshold superheat value (SH close fixed setpoint+SH close band). Then the increased lower threshold superheat value is gradually decreased again until it reaches the original lower threshold superheat value (SH close fixed setpoint).

The higher threshold superheat value (SH close fixed setpoint+SH close band) is selected in such a manner that it is at least 2K higher than the original lower superheat threshold value (SH close fixed Setpoint), as indicated in FIG. 6A.

The increased lower threshold superheat value (SH close dynamic setpoint) is only allowed to increase to a level which is at least 1K lower than the superheat reference value (SH ref) which is applied during normal operation of the vapour compression system.

FIG. 6C illustrates a method according to another embodiment of the invention, where the opening degree of the expansion valve is controlled in accordance with a first control strategy. Similarly to the embodiment illustrated in FIG. 6B, the lower threshold superheat value (SH closed dynamic setpoint) is increased when the superheat value (SH) decreases below the lower threshold superheat value (SH close fixed Setpoint). However, in the embodiment illustrated in FIG. 6C the superheat value increases slower than in the embodiment illustrated in FIG. 6B, in response to the decrease in opening degree (OD) of the expansion valve. Therefore the increased lower threshold superheat value (SH close dynamic setpoint) reaches the higher threshold superheat value (SH close fixed setpoint+SH close band) before the superheat value (SH) increases above the original lower threshold superheat value (SH close fixed Setpoint).

When the increased lower threshold superheat value (SH close dynamic setpoint) reaches the higher threshold superheat value (SH close fixed setpoint+SH close band) the increase of the lower threshold superheat value (SH close dynamic setpoint) is stopped, and the increased lower threshold superheat value (SH close dynamic setpoint) is maintained at this value until the superheat value (SH) reaches the higher threshold superheat value (SH close fixed setpoint+SH close band). Then the increased lower threshold superheat value (SH close dynamic setpoint) is once again decreased as described above.

The higher threshold superheat value (SH close fixed setpoint+SH close band) is selected in such a manner that it is at least 2K lower than the superheat reference value (SH ref), i.e. the superheat value which it is intended to reach during normal operation of the vapour compression system.

Figure 7:
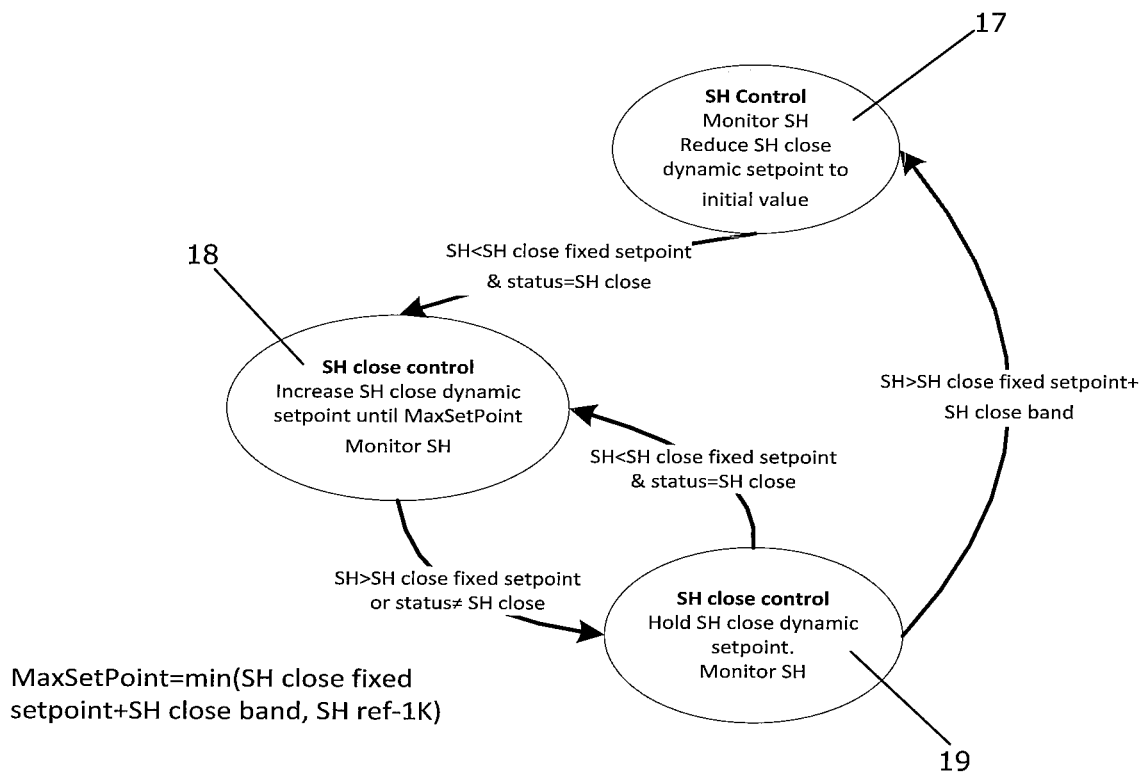
FIG. 7 is a state diagram illustrating a method according to an embodiment of the invention, in which a lower threshold superheat value is adjusted.

FIG. 7 is a state diagram illustrating a method according to an embodiment of the invention, in which a lower threshold superheat value is adjusted. At step 17 the expansion valve of the vapour compression system is controlled based on a measured superheat value, and in order to obtain a reference superheat value of refrigerant leaving the evaporator. Furthermore, the superheat value is monitored.

In the case that the superheat value decreases below a lower threshold superheat value, and if the first control strategy (SH close) is selected, the process is forwarded to step 18, where the expansion valve is operated according to the first control strategy (SH close), and the lower threshold superheat value (SH close dynamic setpoint) is increased, while the superheat value (SH) is monitored.

If the superheat value (SH) increases above the original lower threshold value, and the first control strategy (SH close) is therefore no longer requested, or if the increased lower threshold superheat value (SH dynamic setpoint) reaches a higher threshold superheat value (MaxSetPoint), the process is forwarded to step 19.

At step 19 the opening degree of the expansion valve is still controlled according to the first control strategy (SH close). The lower threshold superheat value (SH dynamic setpoint) is no longer increased, but is maintained at a constant level. Simultaneously, the superheat value (SH) is monitored.

If the superheat value (SH) decreases below the original lower threshold superheat value (SH close fixed Setpoint), the process is returned to step 18. If the superheat value (SH) increases above the higher threshold superheat value (SH close fixed setpoint+SH close band), the process is returned to step 17, and the opening degree of the expansion valve is controlled according to a normal control strategy. Simultaneously, the increased lower threshold superheat value (SH dynamic setpoint) is decreased until it reaches the original lower threshold superheat value (SH close fixed Setpoint).

Figure 8:
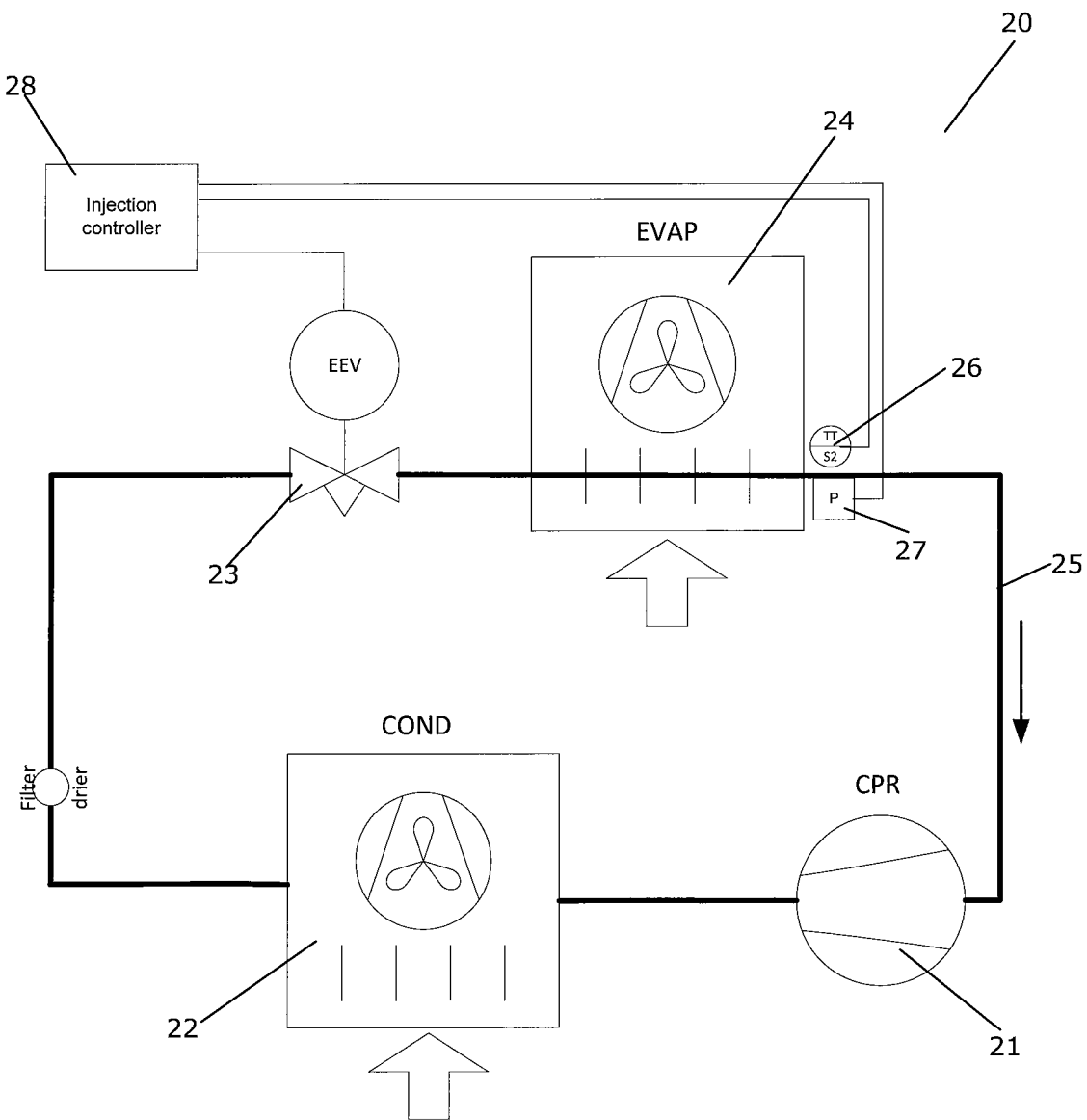
FIG. 8 is a diagrammatic view of a vapour compression system being controlled by means of a method according to an embodiment of the invention.

FIG. 8 is a diagrammatic view of a vapour compression system 20 being controlled by means of a method according to an embodiment of the invention. The vapour compression system 20 comprises a compressor 21, a condenser 22, an expansion valve 23 and an evaporator 24 arranged in a refrigerant path. A suction line 25 interconnects an outlet of the evaporator 24 and an inlet of the compressor 21.

Refrigerant flowing in the refrigerant path is compressed in the compressor 21. The compressed refrigerant is supplied to the condenser 22, where it is at least partly condensed, and heat exchange takes place with the ambient in such a manner that heat is rejected from the refrigerant flowing through the condenser 22. The refrigerant is then supplied to the expansion valve 23, where it is expanded before being supplied to the evaporator 24. Accordingly, the supply of refrigerant to the evaporator 24 is controlled by means of the expansion valve 23. In the evaporator 24, the liquid part of the refrigerant is at least partly evaporated, and heat exchange takes place with the ambient in such a manner that heat is absorbed by the refrigerant flowing through the evaporator 24. Finally, the refrigerant is supplied to the compressor 21, via the suction line 25.

A temperature sensor 26 and a pressure sensor 27 are arranged to measure the temperature and the pressure, respectively, of the refrigerant leaving the evaporator 24 and entering the suction line 25. This allows the superheat value of the refrigerant leaving the evaporator 24 to be calculated, and a separate measurement of the suction pressure is obtained.

The measured temperature and pressure values are supplied to an injection controller 28 arranged to control an opening degree of the expansion valve 23. Based on the received temperature and pressure values, the injection controller 28 determines whether a first control strategy, a second control strategy, or another control strategy shall be selected for controlling the opening degree of the expansion valve 23. This is performed in the manner described above, and in accordance with an embodiment of the invention. Once a control strategy has been selected, the injection controller 28 supplied control signals to the expansion valve 23 in order to control the opening degree of the expansion valve 23 in accordance with the selected control strategy.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising a compressor, a condenser, an expansion valve and an evaporator arranged in a refrigerant path, the refrigerant path defining a suction line interconnecting an outlet of the evaporator and an inlet of the compressor, and the vapour compression system further comprising an injection controller arranged to control an opening degree of the expansion valve, the method comprising the steps of:
   obtaining a superheat value of refrigerant leaving the evaporator and entering the suction line,
   obtaining a suction pressure of refrigerant flowing in the suction line,
   if the obtained superheat value is below a lower threshold superheat value, requesting that the expansion valve is operated according to a first control strategy, in which the expansion valve is closed until the superheat value has increased above the lower threshold superheat value,
   if the obtained suction pressure is below a lower threshold suction pressure value, requesting that the expansion valve is operated according to a second control strategy, in which the expansion valve is kept open until the suction pressure has increased above the lower threshold suction pressure value,
   if only the first control strategy or only the second control strategy is requested, selecting the requested control strategy, and
   if the first control strategy as well as the second control strategy is requested, selecting the second control strategy for a period of time which does not exceed a predefined maximum period of time.

2. The method according to claim 1, further comprising the step of, if the first control strategy as well as the second control strategy is requested, switching to the first control strategy when the predefined maximum period of time has elapsed, or when the suction pressure has increased above the lower threshold suction pressure value, the second control strategy thereby no longer being requested.

3. The method according to claim 2, further comprising the step of reducing the maximum period of time, if the first control strategy as well as the second control strategy has been requested during a previous period of time, and the second control strategy has been selected during said period of time.

4. The method according to claim 2, wherein the injection controller comprises a counter, the method further comprising the step of allowing the counter to count up whenever the first control strategy as well as the second control strategy is requested, and the second control strategy is selected, the counter being allowed to count up until the counter reaches a value corresponding to the predefined maximum period of time.

5. The method according to claim 2, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

6. The method according to claim 2, further comprising the steps of:
monitoring selection of control strategy and determining a number of times a switch between the first control strategy and the second control strategy is performed during a predefined time interval, and
preventing that the second control strategy is selected if the number of times a switch between the first control strategy and the second control strategy is performed during the predefined time interval exceeds a predefined threshold value.

7. The method according to claim 1, further comprising the step of reducing the maximum period of time, if the first control strategy as well as the second control strategy has been requested during a previous period of time, and the second control strategy has been selected during said period of time.

8. The method according to claim 7, wherein the maximum period of time is reduced by an amount which depends on a length of a time interval since said period of time ended and/or the length of said period of time.

9. The method according to claim 8, wherein the injection controller comprises a counter, the method further comprising the step of allowing the counter to count up whenever the first control strategy as well as the second control strategy is requested, and the second control strategy is selected, the counter being allowed to count up until the counter reaches a value corresponding to the predefined maximum period of time.

10. The method according to claim 8, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

11. The method according to claim 7, wherein the injection controller comprises a counter, the method further comprising the step of allowing the counter to count up whenever the first control strategy as well as the second control strategy is requested, and the second control strategy is selected, the counter being allowed to count up until the counter reaches a value corresponding to the predefined maximum period of time.

12. The method according to claim 7, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

13. The method according to claim 1, further comprising the step of allowing a counter to count up whenever the first control strategy as well as the second control strategy is requested, and the second control strategy is selected, the counter being allowed to count up until the counter reaches a value corresponding to the predefined maximum period of time.

14. The method according to claim 13, further comprising the step of allowing the counter to count down whenever the obtained suction pressure is above the lower threshold suction pressure value, and the second control strategy is therefore not requested, and/or whenever the obtained superheat value is above the lower threshold superheat value, and the first control strategy is therefore not requested.

15. The method according to claim 14, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

16. The method according to claim 13, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

17. The method according to claim 1, further comprising the step of gradually increasing the lower threshold superheat value if the obtained superheat value is below the lower threshold superheat value, and the first control strategy is selected, until the increased lower threshold superheat value reaches a higher threshold superheat value, or until the superheat value increases above the increased lower threshold superheat value.

18. The method according to claim 17, further comprising the step of decreasing the increased lower threshold value when the obtained superheat value increases above the higher threshold superheat value, until the decreased lower threshold superheat value reaches the original lower threshold superheat value.

19. The method according to claim 1, further comprising the steps of:
monitoring selection of control strategy and determining a number of times a switch between the first control strategy and the second control strategy is performed during a predefined time interval, and
preventing that the second control strategy is selected if the number of times a switch between the first control strategy and the second control strategy is performed during the predefined time interval exceeds a predefined threshold value.

20. The method according to claim 19, wherein the step of preventing that the second control strategy is selected is further performed on the basis of the obtained suction pressure.

* * * * *